July 23, 1957  E. R. MILLER  2,800,036
PLANETARY TRANSMISSION
Filed Dec. 3, 1953  3 Sheets-Sheet 1
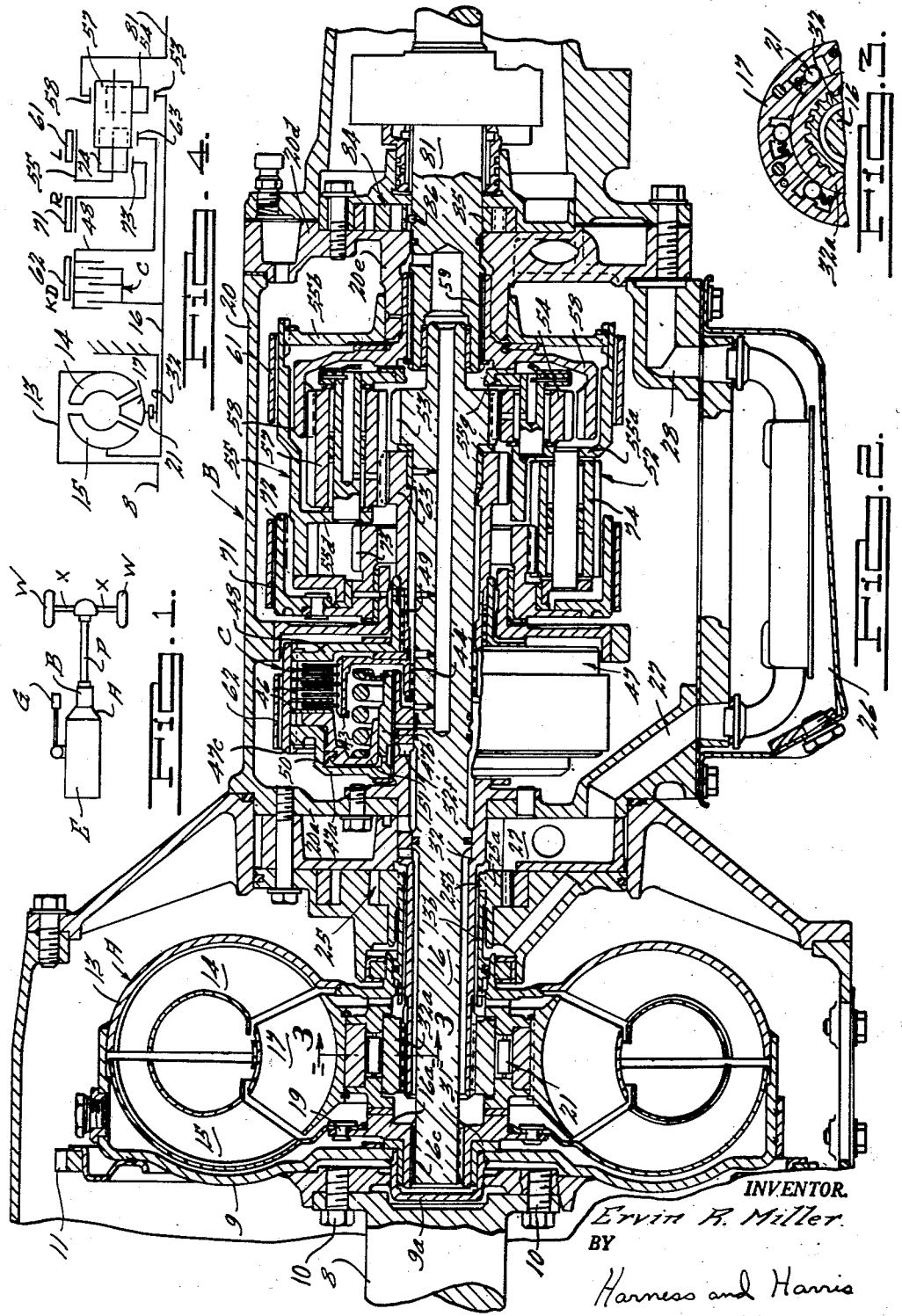
INVENTOR.
Ervin R. Miller
BY
Harness and Harris
ATTORNEYS.

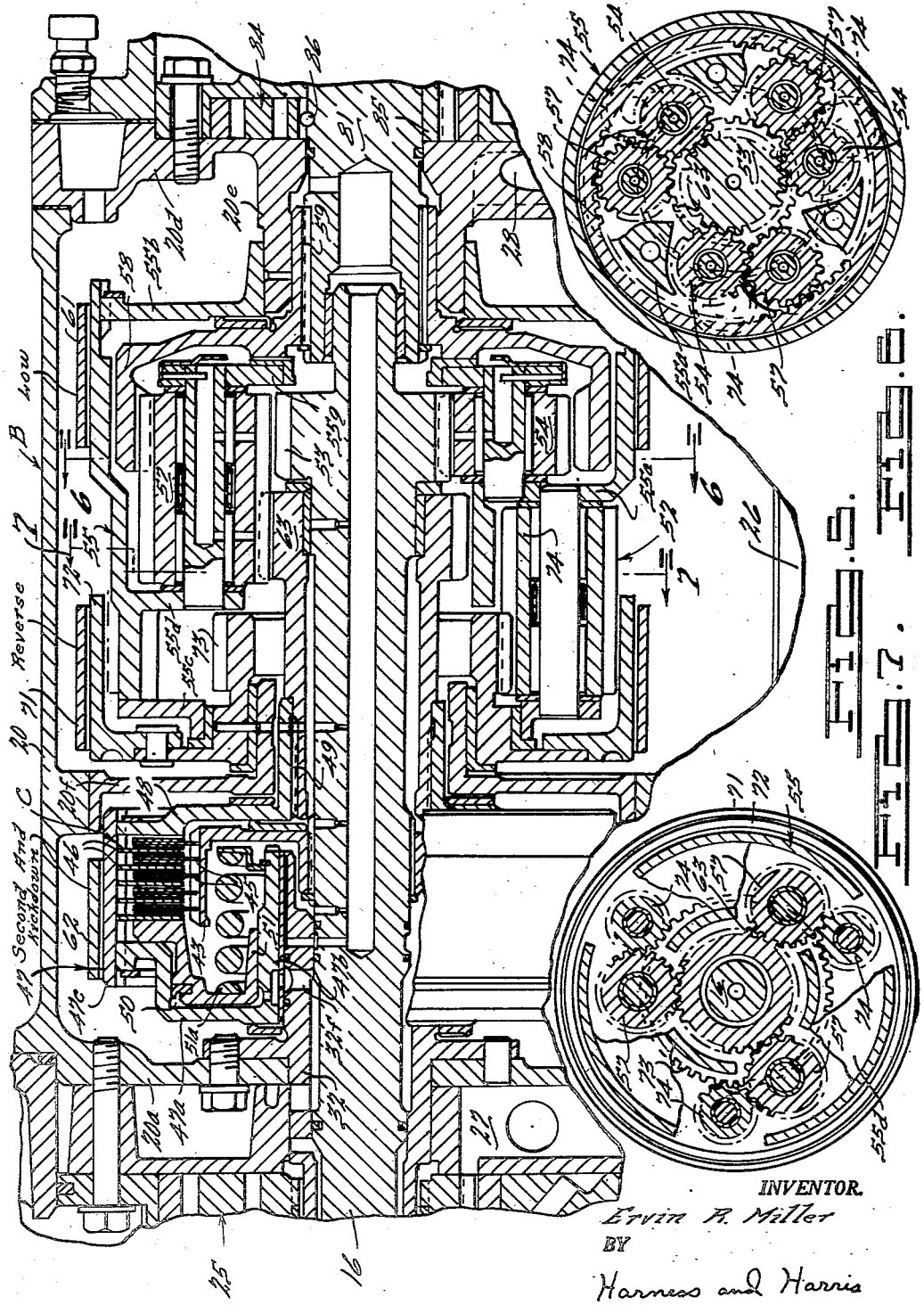

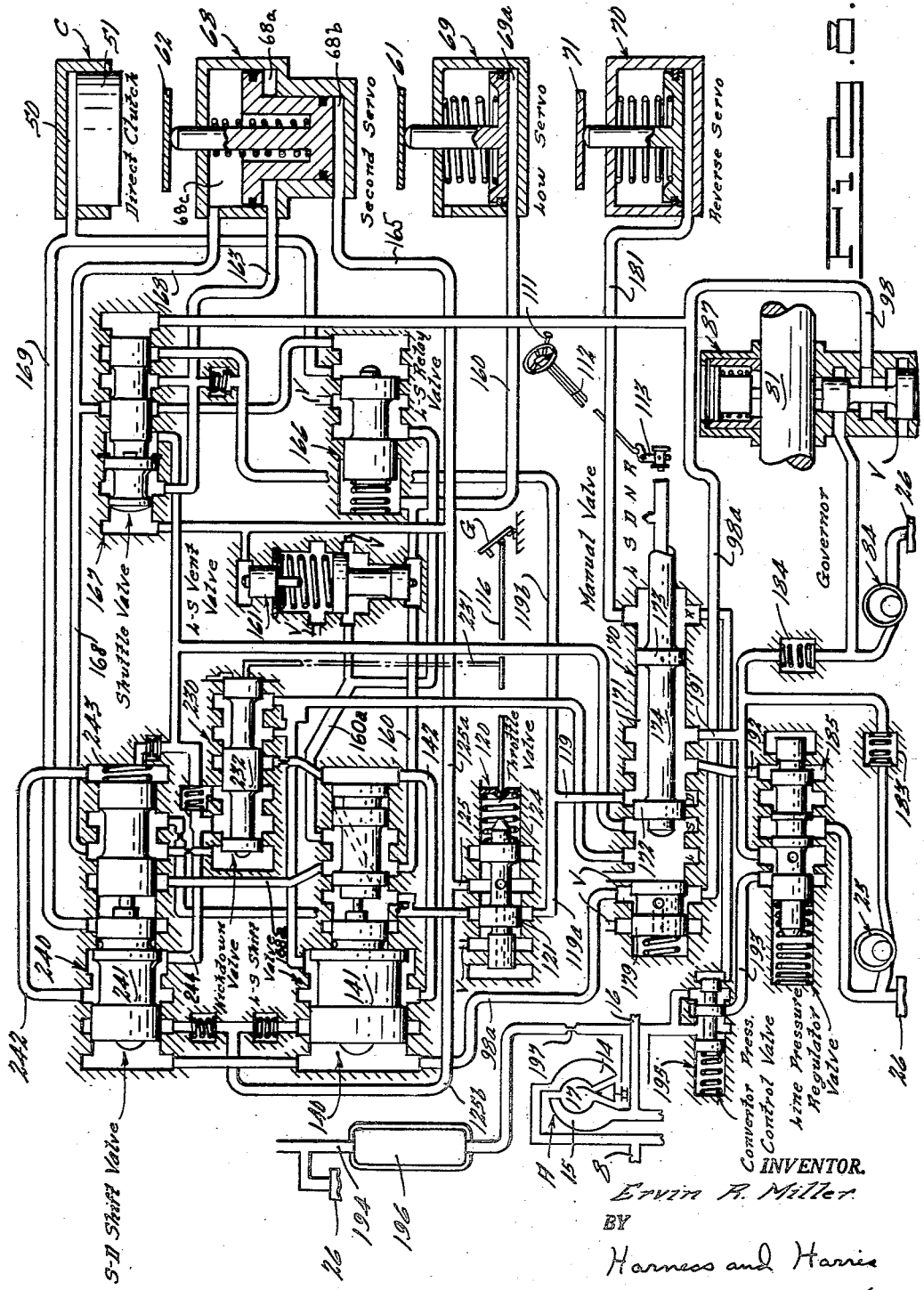

United States Patent Office 2,800,036
Patented July 23, 1957

2,800,036

PLANETARY TRANSMISSION

Ervin R. Miller, Detroit, Mich., assignor to Chrysler Corporation, Highland Park, Mich., a corporation of Delaware Application December 3, 1953, Serial No. 395,941

8 Claims. (Cl. 74—645)

This invention relates to a power transmission unit that comprises a torque multiplying fluid power transmitting device and a planetary type change speed gear box arranged in series relationship for the transmission of drive. More particularly this invention pertains to the change speed gear box and to the control means associated therewith.

It is a primary object of this invention to provide a planetary gear box of a simplified, improved design that may be readily associated with a hydrodynamic torque converter so as to provide a fully automatic three speed power transmission unit wherein the loads and speeds applied to the several elements of the transmission unit are most favorable for long, economical transmission life and most conducive to smooth, fast upshifts and downshifts between the several speed ratio drives.

It is another object of this invention to provide a power transmission unit comprising a series arranged hydrodynamic torque converter and a single compounded planetary gear set wherein only a single clutch and three brakes are required to provide a three forward speed and reverse power transmission unit.

It is still another object of this invention to provide a simplified three speed power transmission unit utilizing a single compounded planetary gear set having a single annulus type output gear, three sun gears, compounded triple pinion gearing mounted in a single carrier, three brake bands and only a single gear train lock-up clutch device. The clutch device is arranged such that it is never required to take full engine torque.

It is still another object of this invention to provide a three forward speeds and reverse gear box comprising a single planetary gear train including a single, cylinder type carrier having three sets of compounded pinion gearing mounted therein and arranged for handling as a unitary assembly.

It is still another object of this invention to provide a planetary gear box comprising a single compounded, three forward speeds and reverse gear set that provides the maximum in rigidity and compactness with the minimum in structural complexity.

Other objects and advantages of this invention will become apparent from a reading of the description below and a consideration of the related drawings wherein:

Fig. 1 is a diagrammatic plan view of the power transmission unit embodying this invention applied to a motor vehicle drive train;

Fig. 2 is a sectional elevational view of a power transmission unit embodying this invention, the power transmission unit including a hydrokinetic torque converter and a planetary type change speed transmission gear box arranged in series relationship;

Fig. 3 is a fragmentary sectional elevational view of portions of the hydrokinetic torque converter, the view being taken along the line 3—3 of Fig. 2;

Fig. 4 is a schematic diagram of this power transmission unit;

Fig. 5 is an enlarged sectional elevational view of the change speed gear box associated with this power transmission unit;

Fig. 6 is a sectional elevational view of the compounded pinion gearing associated with the forward drive planetary gear train, the view being taken along the line 6—6 of Fig. 5;

Fig. 7 is another sectional elevational view of the pinion gearing, the view being taken along the line 7—7 of Fig. 5; and Fig. 8 is a diagrammatic view of a hydraulic control system for the disclosed power transmission unit.

Fig. 1 diagrammatically discloses a conventional motor vehicle power plant and drive train comprising an internal combustion engine E drivingly connected to a hydrokinetic type of torque converter unit A of the power transmission unit that also includes a change speed gear box B. The output from gear box B drives a propeller or drive shaft P that transmits drive to the rear wheels W of the vehicle through the rear driving axles X. Engine E includes the usual carburetor accelerator pedal G.

Fig. 2 of the drawings discloses the power transmission unit per se that comprises a hydrokinetic torque converter unit A and a planetary type change speed gear box B arranged in series drive transmitting relationship. Converter unit A is adapted to drivingly connect a prime mover such as the motor vehicle engine E to the input shaft of transmission gear box B. The reference numeral 8 represents an end portion of an engine driven member, such as the engine crankshaft of the motor vehicle power unit E. The crankshaft 8 is drivingly connected to the drive transmitting casing portion 9 by the screw means 10. The drive transmitting casing portion 9 has an engine starter ring gear 11 mounted on its periphery. Also drivingly connected to the casing portion 9 is the complementary torque converter casing portion 13. Within casing portions 9, 13 are mounted the various converter components, namely, the impeller member 14, the turbine or runner member 15, and the guide wheel or reaction member 17.

The vaned impeller wheel 14 is fixedly connected to the converter casing 13 and is accordingly adapted to be rotatably driven by the engine driven shaft 8. The vaned turbine wheel 15 is drivingly connected by rivet means 19 to a radially extending flange portion formed on the hub member 16a of the converter driven shaft 16. Hub member 16a is connected by splines 16c or the like to the forward end portion of the converter driven intermediate shaft member 16.

The converter driven intermediate shaft member 16 is adapted to transmit drive from the torque converter unit A to the gear box B arranged rearwardly of and in series with the torque converter unit A. The forward end of intermediate shaft 16 is piloted in a bearing assembly 31 that is mounted in an axially extending seat 9a formed in the front end of the converter casing portion 9. The rear end portion of intermediate shaft 16 is piloted in the forward end of the output shaft 81.

The vaned guide wheel 17 of the converter is rotatably supported within the converter casing 13 by means of the one-way brake device 21 (see Fig. 3). The one-way brake device 21 is mounted on the forward end of the axially extending sleeve 32 that is fixed to and projects from the rearwardly positioned, relatively stationary, gear box casing wall 26a. Sleeve 32 has a hub member 32a splined thereto which hub member supports the overrunning or one-way brake device 21. The one-way brake 21 is designed and arranged such that it will permit only forward rotary movement (clockwise when looking from the converter A towards gear box B of Fig. 1) to be transmitted to guide wheel 17 by the forward or clockwise rotation of the impeller 14. The brake 21 locks against the sleeve hub 32a to prevent rotation of the guide wheel 17 in a reverse or counterclockwise direction.

The torque converter unit A includes a gear type oil pump 25 having a driven gear 25a that is directly connected by splineway means 25b to the axially extending, sleeve-like flange portion 13b of the rotatable converter casing 13. The pump 25 draws oil from a sump 26 through the conduit 27 and circulates it through the converter unit A, portions of the transmission lubricating system, and the various hydraulically operated mechanisms associated with this transmission unit. The circulation of oil through the converter A, by the pump 25, provides a means for maintaining the converter full of oil whenever the engine crankshaft 8 is rotating. A second oil pump 84 driven by the transmission output shaft 81 is also included in this power transmission unit to provide a source of pressure fluid when the engine E is not operating. Pump 84 is connected to oil supply sump 26 by conduit 28 and discharges oil to the same elements as pump 25. The pump 84 and its operation will be hereinafter more fully described.

The gear box B includes a friction disc direct drive clutch C that comprises the drum-like annular member 43 which is splined at 44 to the intermediate driven shaft 16. Driven shaft 16 constitutes the input member of clutch C. Mounted on the peripheral portion of the annular member 43 are friction disc clutch elements 45. Clutch elements 45 are adapted to be engaged with cooperating clutch elements 46 carried by the encircling drum-shaped member 47. Drum-shaped member 47 has the plate-like wall 48 thereof drivingly connected at 49 to the kickdown sun gear 63 of the compounded planetary gear set 52 in change speed gear box B. Drum member 47 has wall portions 47a and 47b that journal the member 47 on the rearwardly extending sleeve portion of the aforementioned casing mounted bearing sleeve 32. The walls of drum member 47 are also formed to provide a piston receiving bore 50. Engagement of clutch discs 45 and 46 is effected by the admission of pressure fluid to the cylinder bore 50 in the drum member 47. Pressure fluid admitted to cylinder bore 50 moves the reciprocably mounted piston 51 rearwardly to cause engagement of clutch discs 45 and 46. Compression spring 51a normally urges piston 51 towards a forward, disengaged clutch position. Passage 32f in sleeve 32 provides a means for supplying pressure fluid to the cylinder bore 50.

The planetary gearing that is disposed between the clutch C and the output shaft 81 embodies this invention and represents a modification of the gearing disclosed in the pending application of Bert W. Cartwright, Serial No. 308,123, filed September 5, 1952. This gearing comprises a single set of compounded gearing 52 arranged to provide three forward drive ratios and a reverse drive. Gearing 52 includes the torque converter driven sun gear 53 which is an integral part of the intermediate drive shaft 16. Sun gear 53 drivingly meshes with a first set (see Fig. 6) of relatively short planet pinion gears 54. Pinion gears 54 are rotatably mounted on the transversely extending, radially directed, flange-like wall portion 55a of the stepped, substantially cylindrical, drum-type, pinion gear carrier case 55. Carrier case 55 has a radially extending rear wall portion 55b that is journaled on the housing horn 20e. The carrier case 55 is also provided with a radially extending forward wall portion 55c that is directly journaled on a housing supported sun gear 73. The sun gear 73 is directly mounted for rotation on the gear box bulkhead 20f. It is thus thought to be obvious that the stepped, cylindrical, carrier case 55 is firmly supported for rotation within the gear box B and that it is designed so that it maintains precise alignment of the several gears mounted therein. The first set of carrier case mounted pinion gears 54 meshingly engage with a second set (see Fig. 6) of relatively long, carrier case mounted pinion gears 57. This second set of pinion gears 57 is rotatably supported on the transversely extending, radially directed, flange-like wall portion 55d of the carrier case 55. A plate 55g forms a part of the carrier case 55 and assists in mounting pinions 54, 57 in casing 55. The relatively long, second set of pinion gears 57 meshingly engage with the annulus gear 58 that is drivingly connected by spline means 59 to the output shaft 81. The drive train just described from torque converter driven sun gear 53 to planet pinions 54 to planet pinions 57 to annulus gear 58 to output shaft 81 provides the gearing for the low or first forward drive ratio. When this "low" or first speed forward drive train is to be activated, the low brake band 61 is applied to the exterior surface of the carrier case 55, by servo means 69, shown in Fig. 8, and this anchors the case 55 and provides the reaction for the low or first speed forward drive train.

The "second" speed forward drive ratio, or the "kickdown" ratio, is activated when the brake band 62 is applied by servo means 68, shown in Fig. 8, to the outer peripheral surface portion 47c of the drum member 47 of the clutch device C. Drivingly connected to the portion 47c of the clutch drum 47, by the plate member 48, is a second sun gear 63. Second sun gear 63 drivingly meshes with the second set of relatively long carrier case mounted pinion gears 57. When brake band 62 is applied to anchor sun gear 63 against rotation the "second" or "kickdown" drive train is from converter driven sun gear 53 to planet pinion gears 54 to planet pinion gears 57 to annulus gear 58 to output shaft 81. In "second" or "kickdown" ratio the carrier case 55 is free to rotate in the same direction as the input shaft 16 but at a lower speed. While the same gears transmit the first and second speed ratio drives, still, the carrier case 55 is anchored against rotation in first speed forward drive whereas it is free to rotate in second speed forward drive and this provides the two different forward underdrive ratios.

"Third" speed forward or "direct" drive is achieved by the engagement of the discs 45, 46 of clutch device C. When discs 45, 46 are engaged then the second sun gear 63 and the first sun gear 53 of the compounded planetary gearing 52 are drivingly locked together and this causes the planetary gearing 52 to transmit "direct" drive at a 1 to 1 ratio between input sun gear 53 and output annulus gear 58.

"Reverse" drive is achieved by the application of brake band 71 by servo means 70, shown in Fig. 8, to the peripheral flange 72 of the third sun gear 73. "Reverse" drive sun gear 73 meshingly engages with a third set of relatively long pinion gears 74 (see Fig. 7) that are rotatably supported on the transversely extending, radially directed, flange-like carrier case wall portion 55a. The forward wall 55c of carrier case 55 also assists in mounting the pinions 74. This third set of relatively long planet pinion gears 74 not only meshingly engage the third sun gear 73 but they also meshingly engage with the second set of relatively long planet pinion gears 57 (see Fig. 7). The reaction for reverse drive is produced by anchoring sun gear 73 and this reaction effect is transmitted from anchored sun gear 73 to the long pinion gears 74 to the long pinion gears 57. This reaction effect causes the pinion gear carrier case 55 to rotate in a reverse direction to that of the input sun gear 53. "Reverse" drive is from torque converter driven sun gear 53 to planet pinion gears 54 to planet pinion gears 57, which pinion gears are mounted on the reversely rotating carrier 55, to annulus gear 58 and to the output shaft 81.

On the rear side of the casing wall 20d is mounted the second oil pump 84. Oil pump 84 is similar to oil pump 25 and includes a driving gear element 85 that is drivingly connected by pin means 86 to the transmission output shaft 81. Oil is withdrawn by pump 84 from the transmission case oil sump 26 through the conduit 28. Pressurized oil is distributed by the pump 84 to the supply for the converter A and to the hydraulic control system for the transmission as well as to the pressurized transmission lubrication system.

A hydraulic control system for the herein described transmission unit is shown diagrammatically in Fig. 8 and is similar to the type disclosed in the co-pending applications of William L. Sheppard, Serial No. 254,531, filed November 2, 1951, now Patent No. 2,740,304, and Bert W. Cartwright, Serial No. 308,123, filed September 5, 1952, now Patent No. 2,754,902. The vehicle speed responsive governor mechanism 87, shown mounted on the output shaft 81 of the herein described transmission, is identical to that described and claimed in William L. Sheppard co-pending application Serial No. 98,493, now Patent No. 2,697,363, filed June 11, 1949. In addition to the vehicle speed responsive control 87 some form of torque regulating or torque response control such as a valve operated by the engine accelerator pedal G is included in this transmission control system so as to provide both speed and torque responsive control mechanisms to control operation of the transmission.

It is proposed to have suitable hydraulic controls for this transmission so as to provide a fully automatic three speed gear box in addition to providing means for locking the transmission in either of the two underdrive ratios and reverse drive.

The control system (see Fig. 8) for this transmission includes the manually operable drive ratio selector lever 111 which is rotatably mounted on the conventional motor vehicle steering column 112. Control lever 111 is connected by suitable linkage 113 to the manually operable drive ratio selector valve 174. Valve 174 has five drive ratio positions which are represented in the drawings by the letters R, N, D, S, and L respectively. These letters correspond to the Reverse, Neutral, Drive, Second and Low ratios which ratios are selectively obtainable by manual shift of selector lever 11. The letter V associated with the valve units 120, 170 and with the other valve units of this control system, denotes a vent or drain port for returning the control system pressure fluid to the supply sump 26. Fig. 8 shows the control system when the transmission is conditioned for direct drive or third forward speed.

Pressure fluid from either of the supply pumps 25 or 84 is directed into the main supply conduit 191 which is connected to the manually operable drive ratio selector valve 170. The pressure of the fluid in supply conduit 191 is controlled by the pressure regulator valve 185 and this controlled pump supplied pressure is denoted "line" pressure (90 p. s. i.) for purposes of description hereafter. Check valves 183 and 184 maintain a closed pressure fluid supply system. On admission of "line" pressure fluid to the bore 171 of drive ratio selector valve 170 certain of the control mechanisms associated with the control system will be energized and one or the other of the several aforementioned drive ratios will be established. When the manual valve 170 is located in the Neutral position the valve lands 172 and 173 of plunger valve element 174 close off the escape of pressurized line fluid from valve bore 171 and thus line pressure fluid cannot pass from supply conduit 191 through valve 170 to activate any of the drive ratio control mechanisms. However, it should be noted that when the manually controlled valve 170 is placed in the Neutral position with the vehicle engine running, or when the vehicle is being pushed or towed so that one or the other of pumps 25 or 84 is operating, line pressure fluid from one or the other of pumps 25, 84 can still be directed through conduit 192 to the line pressure regulator valve 185 and through valve 185 to the conduit 193 that supplies pressure fluid to the converter A. Conduit 193 may contain a converter fluid pressure regulator valve 195 to control the pressure of the fluid directed into the converter A. Pressure fluid passing through converter A is passed on to the pressurized transmission lubrication system and to the sump 26 by the conduit 194. Conduit 194 has associated therewith a flow restriction 197 and a converter fluid cooling unit 196. The converter pressure regulator valve 195 preferably maintains a pressure of approximately 55 to 60 p. s. i. in the converter at all times except in reverse.

In either of the forward drive ratio positions D or S or L of the drive ratio selector valve element 174, "line" pressure fluid from supply conduit 191 will always be directed through the bore 171 of valve unit 170 and into the connected conduits 119, 119a that connect the manual drive ratio selector valve unit 170 with the torque controlled or torque responsive throttle valve unit 120 to provide a source of "throttle" pressure. Consequently a form of torque responsive control is always available to cooperate with the driven shaft speed responsive governor 87 which provides a source of "governor" pressure to conjointly control automatic operation of this transmission unit in all forward drive ratios. "Line" pressure passed to conduit 119 whenever the ratio selector valve 170 is in either Drive, Second or Low ratio also fills conduit 119a and is passed around throttle valve 120 through shift valve 140 and into conduit 160 for transfer to the apply side chamber 69a of the Low servo 69 of drive train 52. Thus planetary 52 is initially activated for the Low underdrive whenever valve unit 170 is set for Drive or Second or Low and all starts will be through the Low underdrive initially.

The torque responsive throttle valve unit 120 has operably associated therewith through linkage 231 a kickdown valve-controlled mechanism 230 that is hereinafter described. The torque responsive throttle valve 120 is operated by linkage 116 connected to the throttle control or accelerator pedal G for the engine unit E that drives this power transmission unit. The piston type throttle valve element 121 of valve unit 120 is arranged to be reciprocated by oscillation of the linkage 116. Throttle valve unit plunger element 121 is arranged to reciprocate in the bore of the valve unit 120 and it is connected to the actuating linkage 116 through a compression spring 124. At closed or idle throttle position of the accelerator pedal G with the manual control valve 170 set for either of the forward drive ratios D, S or L, the arrangement of the plunger valve 121 in the bore of valve 120 is such as to permit pressurized fluid to flow from the supply conduit 119a through valve 120 to conduit 125 and branch conduits 125a and 125b. The pressure of the fluid passing out of valve 120 may be lower than that of the line pressure supplied thereto due to the reducing valve action of valve 120. This reduced or compensated line pressure supplied to conduits 125, 125a and 125b, is denoted "throttle" pressure hereafter.

Presence of "throttle" pressure in the branch conduit 125b, at times when the vehicle speed and the "governor" pressure in conduit 98a are relatively low, permits this throttle responsive pressurized fluid to be passed through the valve bore chambers at the left ends of valves 140 and 240 due to the leftward shift of valves 141, 241. This "throttle" pressure is passed into the conduits 142, 242 and is applied to the right ends of the plunger valves 141 and 241 of control valves 140 and 240 respectively when the vehicle is at a stop or traveling at relatively low speeds.

At low vehicle speeds the valves 141, 241 are at the left ends of their valve bores and the supply line 125b can pass "throttle" pressure through the left ends of the valves 140, 240 and into conduits 142, 242 from which it is applied to the right end of valves 140, 240. Drive ratio shift control valves 140 and 240 are differential pressure shift control valves that automatically effect the speed ratio shifts between Low and Second and Second and Direct respectively. The details and the manner of operation of differential pressure operated control valves such as this are quite clearly described in the co-pending applications of William L. Sheppard, Serial No. 98,493, filed June 11, 1949, now Patent No. 2,697,363 and Serial No. 348,485, filed April 13, 1953. "Governor" pressure fluid from the governor output conduit 98 is passed into branch conduit 98a which applies the output shaft speed responsive pressurized fluid to the left end of valves 141 and 241. This "governor" pressure in the valve bores at the left end of valve units 140, 240 tends to urge the plunger type valve elements 141, 241 towards the right ends of the valve units 140, 240. Thus it will be seen that the pressure differential between the throttle responsive pressure fluid that is applied to the right ends of the shift valves 141, 241 and the output shaft speed responsive pressurized fluid which is applied to left ends of valves 141, 241 effects reciprocating movement of the interrelated shift valves 141, 241. At relatively low output shaft speeds the "throttle" pressure is greater than the "governor" pressure and the valves 141, 241 are automatically positioned at the left ends of their valve bores. As the output shaft speed increases a point is reached where the "governor" pressure exerts a force on the left end of the valves 141, 241 that overcomes the force of the "throttle" pressure on right ends of the valves and then valves 141, 241 successively shift towards the right to positions such as those actually shown in Fig. 8 which correspond to the upshifted Direct drive. This differential pressure generated shift of the valves 141, 241 is utilized to automatically control operation of the direct drive clutch C and the servos 68 and 69 for the forward drive braking bands 61, 62. It should be pointed out that the diameter of valve 141 is greater than the diameter of valve 241 and thus the same pressurized fluids admitted to the valve units 140, 240 will produce different shift forces and as a result different points are obtainable for the shifts from Low to Second and Second to Direct. Also valve 241 must work against a spring 243 so this tends to raise its upshift point above that of the Low to Second shift valve 141. Upshift of valve 141 may occur from about 9 to 18 M. P. H. while upshift of valve 241 may occur from about 18–68 M. P. H. It is thought to be obvious that the points of shift of valves 141, 241 will vary considerably depending on the degree of throttle valve opening as compared to the output shaft speed at any given time.

After initiating drive in "Low" the rightward shift of shift valve 141, on attainment of a predetermined vehicle speed for a given throttle valve opening, will vent the band applying "line" pressure from "Low" servo 69 through the vent V of vent valve 161 due to line 160 being connected to the vent valve 161 by line 160a. At the same time upshift of valve 141 will vent the existing "line" pressure from the band "off" or release chamber 68c of the "Second" speed control servo 68. On upshift of valve 141 from Low to Second, the valve 141 is positioned as shown in Fig. 8 whereas the valve 241 will be positioned to the left of the position shown in Fig. 8. At this time conduit 168 is connected to vent valve 161 by way of connected conduits 168, valve 240, conduit 168a, valve 140 and conduit 160a. It is thought to be obvious that during operation in "Low" "line" pressure was applied by way of connected conduits 119, 119a, valve 140 and conduit 160 to the "off" chamber 68c of Second servo 68 to render the Second speed drive inactive while operating in Low. Thus as "Low" control band 61 is released and the "line" pressure vented from chamber 68c of the Second servo, the "Second" control band 62 is applied to effect the upshift to "Second" speed. In addition to using "line" pressure to apply "Second" band 62, "throttle" pressure is also applied to chamber 68b of servo 68 by way of conduit 165 to assist the "line" pressure in chamber 68a in holding band 62 applied.

After the upshift from "Low" to "Second" then subsequently the shift valve 240 will be shifted to the right by the governor" pressure applied to the left end of valve 240. This rightward shift of valve 241 will admit "line" pressure to conduits 168 and 169 and will effect an automatic upshift from "Second" to "Direct." To accomplish this shift, "line" pressure is directed into release chamber 68c of servo 68 by way of conduit 168 so as to effect release of "Second" band 62. At the same time "line" pressure is directed by way of conduit 169 into the bore 50 of "Direct" clutch C to cause engagement of clutch C and lock up of planetary 52 so as to provide for the transmission of a direct drive from shaft 16 to output shaft 81. Automatic downshifts from Direct to Second to Low are effected in the reverse manner to that described for the upshifts.

In addition to the automatic downshifts it is possible for the transmission operator to overrule the automatic controls and effect a downshift from "Direct" to "Second" at substantially any time he desires by merely fully depressing the accelerator pedal G. Such an accelerator depression will cause linkage 116 to apply linkage 231 to the right end of kickdown valve 230 and shift valve element 232 to the left. Leftward shift of valve 232 when the transmission is operating in "Direct" will bring about an immediate downshift from "Direct" to "Second" due to the application of first pressurized "line" pressure fluid and thereafter "throttle" pressure fluid to the right end of shift valve 241. When in Direct before the kickdown, there is "line" pressure in the chamber at the left end of the kickdown valve 230. On kickdown the valve 232 is shifted leftward and this connects the "line" pressure from the left end chamber of valve 230 to the conduit 244 and through valve 240 to conduit 242 that applies "line" pressure to the right end of valve 241 to shift it leftward to a downshifted or kickeddown position. Subsequently the "line" pressure supply is cut off and "throttle" pressure admitted to conduit 242. When valve 241 is kicked down then "line" pressure is supplied to chamber 68a of servo 68 and venting of the bore 50 of clutch C occurs. After the kickdown to "Second" the transmission control system will either automatically upshift to "Direct" on release of the depressed accelerator G, or, if the output shaft speed should be dropping, then possibly the control system would automatically downshift to "Low" for a more favorable speed ratio drive in the starting underdrive ratio.

In addition to the operator effected, accelerator pedal actuated downshift, the transmission operator can also downshift from "Direct" to "Second" or "Low" by manually shifting drive control lever 111 to either the "Second" or "Low" position. This manual shift will lock the transmission in the particularly selected drive ratio and prevent automatic upshifts or downshifts therefrom. Locking of the transmission in either the "Second" or "Low" ratio is particularly advantageous for coast braking. It might be pointed out that the control system includes valve means 179 in the manual control valve unit 170 to limit the top speed at which the manual downshift to "Low" may be accomplished. At very high speeds the "governor" pressure in conduit 98a which is applied to the left end of the valve 179 will prevent shift of the drive ratio selector valve 174 leftward to the Low position. If the manual shift to "Low" is attempted at too high a speed then the transmission will first downshift to "Second" and thereafter, when the speed has dropped sufficiently, will then downshift to "Low" and remain locked in the preselected "Low" ratio until the control lever 111 is shifted to some other ratio.

Reverse drive is accomplished by setting the drive control lever 111 in the Reverse position. This cuts off the supply of "line" pressure to conduit 192 and causes the control system line pressure regulator valve 185 to pass a boosted "line" pressure through conduit 181 to the Reverse servo 70 and apply band 71 to sun gear 73 so as to condition planetary gear set 52 for transmission of a reverse drive to output shaft 81. The operation of the "line" pressure regulator valve 185, whereby a "boosted"

line pressure is supplied in Reverse, is clearly described in the application of William I. Sheppard, Serial No. 254,531, filed November 2, 1951, and forms no part of this invention. The other portions of the control system are deactivated at this time so there is no automatic upshifting or downshifting involved. However, in addition to the torque effect of the gear set 52 there is also the torque multiplication of the converter A so a starting reverse drive ratio of about 18.0 to 1 is possible with conventional gearing and axle ratio.

As the invention herein described and claimed does not relate to the specific controls but to the gear box per se combined with some form of speed and torque responsive controls, it is not thought that a more detailed description of the control system is required. Suffice it to say that with the torque converter A having a torque multiplying stall ratio of 2.5 and with a rear wheel driving axle ratio of 3.1, then the table set forth below gives the pertinent information relative to the driving ratios obtainable with a transmission of this type.

| Drive Ratio | 2.5 Torque Converter | 3.1 Axle Ratio | |
|---|---|---|---|
| | Control Applied | Gear Ratio | Overall Ratio |
| Low (1st) | Band 61 | 2.69 | 20.9-8.35 |
| Kickdown (2nd) | Band 62 | 1.53 | 4.74 |
| Direct (3rd) | Clutch C | 1.00 | 3.10 |
| Reverse | Band 71 | 2.32 | 18.0-7.19 |

From a consideration of the aforegoing description and the related drawings, it is thought to be clear that this transmission provides a compact, rigid, relatively simple gear box that can be combined with a hydrodynamic torque converter device to provide a fully automatic three speed gear box that will give the required ratios and flexibility in order to efficiently operate a present day motor vehicle in current traffic and on current highways. When forward drive is to be initiated, the controls are set in Drive and this will initially apply the Low band 61 to carrier 55 and thereby activate gear set 52 for the "Low" ratio. By initially starting in "Low" or 1st speed, the gearing 52 is combined with the torque multiplication of converter A so as to give a starting drive overall ratio of as much as 20.9 to 1. The control system will thereafter, when speed and torque conditions are satisfactory, automatically release band 61 and apply band 62 to sun gear member 63 so as to upshift the drive ratio from the "Low" or 1st speed to the 2nd or "Kickdown" speed ratio drive. Thereafter, when speed and torque conditions are satisfactory, the control system will again automatically upshift the speed ratio drive from the "Second" ratio to the "Direct" speed ratio by releasing band 62 and engaging direct drive clutch C. A downshift may be manually accomplished from the "Direct" drive to both the "Second" and the "Low" ratios. The control system includes means to lock the controls in either of the "Low" or "Kickdown" ratios so that each of these ratios may be used for coast braking or the like.

It will be noted that the transmission disclosed utilizes only a single clutch C and three planetary brake bands 61, 62 and 71 to provide a three speed and reverse drive gear box. Furthermore, the most frequent shift, namely that between direct drive and "Kickdown" or "Second" speed, involves the alternate application and release of the clutch C and band 62. Such a shift is considered to be much preferred over a clutch to clutch shift due to the smaller quantities of pressure fluid that need to be transferred during the shift period. In addition it will be noted that during use of the "Kickdown" or "Second" ratio only the epicylic gear train 52 is activated and it will be found that the loads on the elements of this gear set are relatively low.

Another advantageous feature of this transmission gear box is the design whereby each band and clutch reaction member is journaled on a stationary rigid gear box housing element such that deflection loads will not be applied to the drive transmitting gear elements of the transmission unit.

Another and most important feature of this invention is the provision of a three forward speeds and reverse planetary type gear box that has a minimum number of gears (13) for the several ratios obtainable therewith, due to the novel arrangement of the gears therein which arrangement permits the various gears to operate in several different combinations. This gear set 52 includes a single carrier case 55 of stepped, substantially cylindrical, construction that provides a casing for housing the nine (9) planet pinion gears in addition to receiving the associated three (3) sun gears and the single (1) output annular gear. This planet pinion carrier case, which may be cast as a single unit except for wall 55b, not only houses all nine (9) pinion gears but it also serves as the low ratio brake drum. This gives a low cost planet pinion carrier due to the minimum of machining and provides the highly desirable cast iron braking surface for the "low" band 61. This unitary carrier case 55 also means less labor and less handling of parts in production by virtue of all nine (9) planet pinion gears being contained in one sub-assembly. The specific design of the carrier case 55 and its associated gearing is thought to provide an advance over the prior art.

I claim:

1. A multispeed power transmission unit comprising a gear box housing rotatably mounting an input shaft, an output shaft, and a compounded planetary gear set arranged in series between and interconnecting said shafts, said gear set comprising a planet pinion carrier case rotatably mounted in said housing and arranged concentrically about and bridging the adjacent ends of said shafts, a first sun gear drivingly mounted on said input shaft and arranged concentrically within said carrier case, a second sun gear rotatably mounted in said housing and arranged concentrically within said carrier case, a clutch device connectible between said input shaft and said second sun gear, a first brake means to selectively anchor said second sun gear against rotation, a third sun gear rotatably mounted in said housing and arranged concentrically within said carrier case, a second brake means to selectively anchor said third sun gear against rotation, a first set of planet pinion gearing rotatably mounted in said carrier case and meshingly engaged with said first sun gear, a second set of planet pinion gearing rotatably mounted in said carrier case and meshingly engaged with said first set of planet pinion gearing and with said second sun gear, an annulus gear meshingly engaged with said second set of planet pinion gearing and drivingly connected to said output shaft, a third set of planet pinion gearing rotatably mounted in said carrier case and meshingly engaged with said third sun gear and with said second set of planet pinion gearing, and a third brake means to selectively anchor said carrier case against rotation.

2. A multispeed power transmission unit comprising a gear box housing rotatably mounting an input shaft, an output shaft, and a compounded planetary gear set arranged in series between and interconnecting said shafts, said gear set comprising a substantially cylindrical, drum-type, planet pinion carrier case rotatably mounted in said housing and arranged concentrically about and bridging the adjacent ends of said shafts, a first sun gear drivingly mounted on said input shaft and arranged concentrically within said carrier case, a second sun gear rotatably mounted in said housing and arranged concentrically within said carrier case, a clutch device connectible between said input shaft and said second sun gear, a first brake means to selectively anchor said second sun gear against rotation, a third sun gear rotatably mounted in said housing and arranged concentrically within said carrier case, a second brake means to selectively anchor said third sun gear against rotation, a first radially extending, interiorly disposed, flange on said carrier case, a first set of planet pinion gearing rotatably mounted on said first carrier case flange and meshingly engaged with said first sun gear, a second radially extending, interiorly disposed, carrier case flange, a second set of single diameter planet pinion gearing rotatably mounted on said second case flange and meshingly engaged with said first set of planet pinion gearing and with said second sun gear, an annulus gear meshingly engaged with said second set of planet pinion gearing and drivingly connected to said output shaft, a third set of planet pinion gearing rotatably mounted on said first carrier case flange and meshingly engaged with said third sun gear and with said second set of planet pinion gearing, and a third brake means engageable with the exterior of said carrier case to selectively anchor said carrier case against rotation.

3. A multispeed power transmission unit comprising a gear box housing rotatably mounting an input shaft, an output shaft, and a compounded planetary gear set arranged in series between and interconnecting said shafts, said gear set comprising a substantially cylindrical, drum-type, planet pinion carrier case rotatably mounted in said housing and arranged concentrically about and bridging the adjacent ends of said shafts, a first sun gear drivingly mounted on said input shaft and arranged concentrically within said carrier case, a second sun gear rotatably mounted in said housing and arranged concentrically within said carrier case, a clutch device connectible between said input shaft and said second sun gear, a first brake means to selectively anchor said second sun gear against rotation, a third sun gear rotatably mounted in said housing and arranged concentrically within said carrier case, a second brake means to selectively anchor said third sun gear against rotation, a first radially extending, interiorly disposed, flange on said carrier case, a first set of planet pinion gearing rotatably mounted on said first carrier case flange and meshingly engaged with said first sun gear, a second radially extending, interiorly disposed, carrier case flange, a second set of single diameter planet pinion gearing rotatably mounted on said second case flange and meshingly engaged with said first set of plan pinion gearing and with said second sun gear, an annulus gear meshingly engaged with said second set of planet pinion gearing and drivingly connected to said output shaft, a third set of planet pinion gearing rotatably mounted on said first carrier case flange and meshingly engaged with said third sun gear and with said second set of planet pinion gearing and rotatable relative thereto, radially extending end walls on said carrier case rotatably mounting the carrier case in the gear box housing, and a third brake means engageable with the exterior of said carrier case to selectively anchor said carrier case against rotation.

4. A multispeed power transmission unit comprising a gear box housing rotatably mounting an input shaft, an output shaft, and a compounded planetary gear set arranged in series between and interconnecting said shafts, said gear set comprising a drum-type planet pinion carrier case rotatably mounted in said housing and arranged concentrically about and bridging the adjacent ends of said shafts, a first sun gear drivingly mounted on said input shaft and arranged concentrically within said carrier case, a second sun gear rotatably mounted in said housing and arranged concentrically within said carrier case, a clutch device connectible between said input shaft and said second sun gear, a first brake means to selectively anchor said second sun gear against rotation, a third sun gear rotatably mounted in said housing and positioned within said carrier case, a second brake means to selectively anchor said third sun gear against rotation, a first set of relatively short planet pinion gearing rotatably mounted in said carrier case and meshingly engaged with said first sun gear, a second set of relatively long single diameter planet pinion gearing rotatably mounted in said carrier case and meshingly engaged with said first set of relatively short planet pinion gearing and with said second sun gear, an annulus gear meshingly engaged with said second set of planet pinion gearing and drivingly connected to said output shaft, a third set of relatively long planet pinion gearing rotatably mounted in said carrier case and meshingly engaged with said third sun gear, said third set of planet pinion gearing having portions overlapping and meshingly engaged with said second set of planet pinion gearing, and a third brake means to selectively anchor said carrier case against rotation.

5. A multispeed power transmission unit comprising a gear box housing rotatably mounting an input shaft, an output shaft, and a compounded planetary gear set arranged in series between and interconnecting said shafts, said gear set comprising a planet pinion carrier case rotatably mounted in said housing and arranged concentrically about and bridging the adjacent ends of said shafts, a drive input gear drivingly mounted on said input shaft and arranged within said carrier case, a first reaction gear rotatably mounted in said housing and positioned within said carried case, a clutch device connectible between said input shaft and said first reaction gear, a first brake means to selectively anchor said first reaction gear against rotation, a second reaction gear rotatably mounted in said housing and positioned within said carrier case, a second brake means to selectively anchor said second reaction gear against rotation, a first set of planet pinion gearing rotatably mounted in said carrier case and meshingly engaged with said drive input gear, a second set of single diameter planet pinion gearing rotatably mounted in said carrier case and meshingly engaged with said first set of planet pinion gearing and with said first reaction gear, a drive output gear meshingly engaged with said second set of planet pinion gearing and drivingly connected to said output shaft, a third set of planet pinion gearing rotatably mounted in said carrier case and meshingly engaged with said second reaction gear and with said second set of planet pinion gearing and rotatable relative thereto, and a third brake means to selectively anchor said carrier case against rotation.

6. An engine driven motor vehicle power transmission unit comprising a hydrodynamic torque converter including impeller, turbine and reaction members, and a multispeed planetary gear box including a housing rotatably mounting an input shaft drivingly connected to said converter turbine member, an output shaft, and a compounded planetary gear set arranged in series between and interconnecting said shafts, said gear set comprising a planet pinion carrier case rotatably mounted in said housing and arranged concentrically about and bridging the adjacent ends of said shafts, a first sun gear drivingly mounted on said input shaft and arranged concentrically within said carrier case, a second sun gear rotatably mounted in said housing and arranged concentrically within said carrier case, a clutch device connectible between said input shaft and said second sun gear, a first brake means to selectively anchor said second sun gear against rotation, a third sun gear rotatably mounted in said housing and arranged concentrically within said carrier case, a second brake means to selectively anchor said third sun gear against rotation, a first set of planet pinion gearing rotatably mounted in said carrier case and meshingly engaged with said first sun gear, a second set of single diameter planet pinion gearing rotatably mounted in said carrier case and meshingly engaged with said first set of planet pinion gearing and with said second sun gear, an annulus gear meshingly engaged with said second set of planet pinion gearing and drivingly connected to said output shaft, a third set of planet pinion gearing rotatably mounted in said carrier case and meshingly engaged with said third sun gear and with said second set of planet pinion gearing, a third brake means to selectively anchor said carrier case against rotation, and pressure fluid operated control means conjointly responsive to the output shaft speed and to the degree of opening of the engine accelerator means to automatically control speed change operation of the transmission unit.

7. A multispeed power transmission unit comprising a gear box housing rotatably mounting an input shaft, an output shaft, and a compounded planetary gear set arranged in series between and interconnecting said shafts, said gear set comprising a planet pinion carrier case rotatably mounted in said housing and arranged concentrically about and bridging the adjacent ends of said shafts, a first sun gear drivingly mounted on said input shaft and arranged within said carrier case, a second sun gear rotatably mounted in said housing and arranged concentrically within said carrier case, a clutch device connectible between said input shaft and said second sun gear, a first brake means to selectively anchor said second sun gear against rotation, a third sun gear rotatably mounted in said housing and arranged concentrically within said carrier case, a second brake means to selectively anchor said third sun gear against rotation, a first set of planet pinion gearing rotatably mounted in said carrier case and meshingly engaged with said first sun gear, a second set of single diameter planet pinion gearing rotatably mounted in said carrier case and arranged concentrically about said first and second sun gears and meshingly engaged with said first set of planet pinion gearing and with said second sun gear, an annulus gear meshingly engaged with and arranged concentrically about said second set of planet pinion gearing and drivingly connected to said output shaft, a third set of planet pinion gearing rotatably mounted in said carrier case and arranged concentrically about and meshingly engaged with said third sun gear and said second set of planet pinion gearing, and a third brake means to selectively anchor said carrier case against rotation.

8. A multispeed power transmission unit comprising a gear box housing rotatably mounting an input shaft, an output shaft, and a compounded planetary gear set arranged in series between and interconnecting said shafts, said gear set comprising a planet pinion carrier case rotatably mounted in said housing and arranged concentrically about and bridging the adjacent ends of said shafts, a first sun gear drivingly mounted on said input shaft and arranged within said carrier case, a second sun gear rotatably mounted in said housing and positioned within said carrier case, a clutch device connectible between said input shaft and said second sun gear, a first brake means to selectively anchor said second sun gear against rotation, a third sun gear rotatably mounted in said housing and positioned within said carrier case, a second brake means to selectively anchor said third sun gear against rotation, an annulus gear drivingly connected to said output shaft, three sets of compounded planet pinion gearing rotatably mounted in said carrier case with one of said sets of planet pinion gearing meshingly engaged with said first sun gear, a second set of said planet pinion gearing meshingly engaged with said annulus gear and with said one set of planet pinion gearing, a third set of said planet pinion gearing meshingly engaged with said third sun gear with one of said other sets of planet pinion gearing, and a third brake means to selectively anchor said carrier case against rotation.

References Cited in the file of this patent

UNITED STATES PATENTS

| 752,953 | Brush | Feb. 23, 1904 |
| 2,590,280 | Swift | Mar. 25, 1952 |
| 2,605,652 | Kelbel | Aug. 5, 1952 |
| 2,667,085 | Ackerman | Jan. 26, 1954 |

FOREIGN PATENTS

| 632,292 | Great Britain | Dec. 30, 1945 |
| 866,747 | Germany | Feb. 12, 1953 |